United States Patent
Ting et al.

(10) Patent No.: US 6,852,810 B2
(45) Date of Patent: Feb. 8, 2005

(54) MOLECULAR BLENDED POLYMER AND PROCESS FOR PREPARING THE SAME

(75) Inventors: Ching Ting, HsinChu (TW); Joung-Yei Chen, HsinChu (TW); Shu-Hua Chan, Miao-Li (TW)

(73) Assignee: Industrial Technology Research Institute, HsinChu (TW)

( * ) Notice: Subject to any disclaimer, the term of this patent is extended or adjusted under 35 U.S.C. 154(b) by 7 days.

(21) Appl. No.: 10/107,366

(22) Filed: Mar. 28, 2002

(65) Prior Publication Data

US 2003/0187159 A1 Oct. 2, 2003

(51) Int. Cl.⁷ .................................................. C08F 4/02
(52) U.S. Cl. ....................... 526/113; 526/114; 526/118; 526/119; 526/346; 526/318; 526/124.3; 525/191; 525/197; 525/221; 525/240; 525/241
(58) Field of Search ................................ 526/113, 114, 526/118, 119, 346; 525/191, 197, 221, 240, 241

(56) References Cited

U.S. PATENT DOCUMENTS

| | | | | |
|---|---|---|---|---|
| 5,807,800 A | * | 9/1998 | Shamshoum et al. | ....... 502/104 |
| 6,037,296 A | * | 3/2000 | Hsieh et al. | ................. 502/113 |
| 6,544,923 B1 | * | 4/2003 | Ying et al. | .................... 502/159 |
| 2001/0031355 A1 | * | 10/2001 | Nakagawa et al. | .......... 428/355 |
| 2002/0034991 A1 | * | 3/2002 | Sasaki et al. | ................ 473/378 |
| 2002/0065150 A1 | * | 5/2002 | Kato et al. | ................... 473/371 |
| 2002/0173380 A1 | * | 11/2002 | Ohama et al. | .............. 473/371 |
| 2003/0026974 A1 | * | 2/2003 | Lenox et al. | ............. 428/319.3 |

OTHER PUBLICATIONS

Hawley's Condensed Chemical Dictionary, 13ᵗʰ Edition, John Wiley & Sons, 1997, p. 760.*

* cited by examiner

*Primary Examiner*—Roberto Rabago
(74) *Attorney, Agent, or Firm*—Sughrue Mion, PLLC

(57) ABSTRACT

The present invention provides a molecular blended polymer that includes two or more types of polymers blended at the molecular level. At least one monomer is polymerized in the presence of two or more kinds of catalysts supported on a mesoporous molecular sieve having a pore size of 20 Å to 500 Å. The polymerization occurs in the pore of the mesoporous molecular sieve and is controlled at the molecular level. Thus, the polymer material is controlled extremely well and the function and physical properties of the polymer material are greatly enhanced.

20 Claims, 2 Drawing Sheets

MOLECULAR BLENDED POLYMER AND PROCESS FOR PREPARING THE SAME

BACKGROUND OF THE INVENTION

1. Field of the Invention

The present invention relates to a polymer blend, and more particularly to a molecular blended polymer which includes two or more types of polymers blended at the molecular level.

2. Background of the Invention

In order to improve the properties of a single polymer, blending two or more types of polymers to obtain a polymer blend is a frequently-used technique.

For example, Picchioni et al. prepare a blend of syndiotactic polystyrene and SBS triblock copolymer by mechanical mixing and solution casting (Macromol. Chem. Phys. 2001, 202, 2142–2147). Xu et al. prepare a blend of syndiotactic polystyrene and isotactic polypropene using two different Ziegler-Natta catalysts (Macromol. Chem. Phys. 2001, 202, 1817–1823). Abis et al. prepare a blend of syndiotactic polystyrene and high density polyethylene using SEBS copolymer as a compatibilizer (Macromol. Chem. Phys. 2000, 201, 1732–1741).

However, the conventional polymer blend suffers from phase separation. In addition, for the polymer blend prepared by polymerizing two monomers using two catalysts (for example, in the above Xu's paper), the polymerization is not well-controlled. Thus, the microstructure and physical properties of the polymer are adversely affected.

SUMMARY OF THE INVENTION

The object of the present invention is to provide a polymer blend with homogeneous blending and without phase separation. The polymer blend of the present invention is a molecular blended polymer which includes two or more types of polymers blended at the molecular level.

Another object of the present invention is to provide a process for preparing a molecular blended polymer. First, a mesoporous molecular sieve having a pore size of 20 Å to 500 Å is provided. Then, the mesoporous molecular sieve, at least one monomer, and a catalytically effective amount of two or more kinds of catalysts are contacted under polymerizing conditions to undergo polymerization. The polymerization occurs in the pore of the mesoporous molecular sieve and is controlled at the molecular level. Thus, the polymer material is controlled extremely well and the function and physical properties of the polymer material are greatly enhanced.

DETAILED DESCRIPTION OF THE INVENTION

Figure 1:
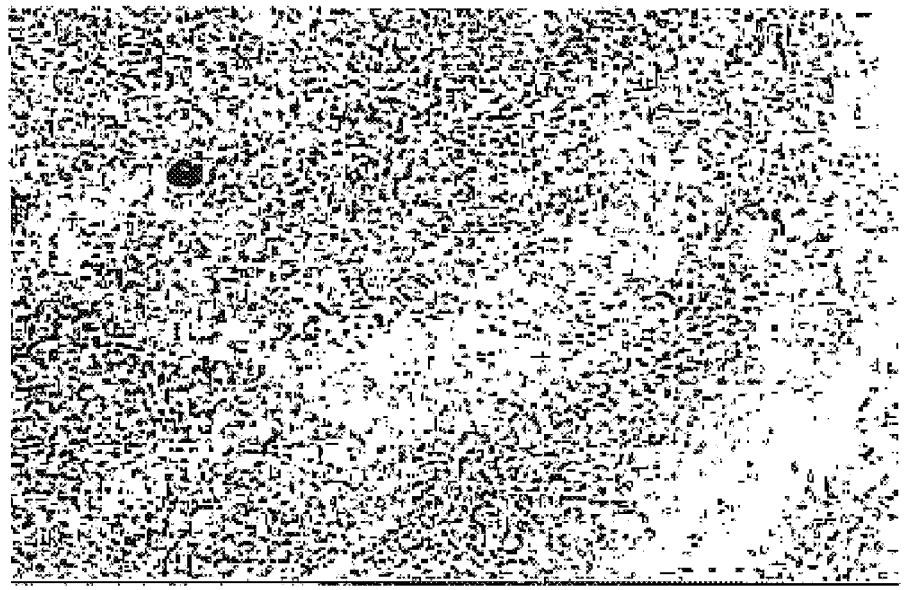
FIG. 1 is an optical micrograph, taken at an optical polarizing microscopy, of pure syndiotactic polystyrene (sPS).

The main object of the present invention is to provide at least one monomer to undergo polymerization in a molecule-scaled (or nanoscaled) reactor. Since the nanoscaled reactor is very small compared with an ordinary reactor, the monomer is forced to react in a confined space. Thus, when the monomer is polymerized in the presence of two different catalysts, the obtained two different kinds of polymers are forced to blend in the confined space. Therefore, the blended polymer is very homogeneous. In the present invention, such polymer blend that includes two or more types of polymers blended at the molecular level is called "molecular blended polymer".

The present invention represents the first time such a molecular blended polymer has been developed. Preferably, the molecular blended polymer is obtained through confinement of a mesoporous molecular sieve. The mesoporous molecular sieve can have a pore size of 20 Å to 500 Å.

The molecular blended polymer of the present invention can be prepared using a catalyst composition supported on a mesoporous molecular sieve. That is to say, in this case, the so-called nanoscaled reactor is the pore of the mesoporous molecular sieve. The process for preparing the molecular blended polymer of the present invention using the supported catalyst composition is decribed below. First, a mesoporous molecular sieve having a pore size of 20 Å to 500 Å is provided. The mesoporous molecular sieve, at least one monomer, and a catalytically effective amount of two or more kinds of catalysts are contacted under polymerizing conditions to undergo polymerization.

Preferably, the catalysts are supported on the mesoporous molecular sieve before they contact the monomer. That is, the mesoporous molecular sieve and two or more kinds of catalysts are reacted to prepare a supported catalyst. Then, at least one monomer is polymerized under polymerizing conditions in the presence of a catalytically effective amount of the supported catalyst.

The inorganic porous support materials useful in the present invention are typically inorganic oxides of silica, silica-alumina, silica-thoria, silica-zirconia, clay, crystalline silicates, e.g., zeolites and silicoaluminophosphates (SAPOs) and comparable oxides which are porous, and have surface hydroxyl groups, viz., silanol groups. Other suitable inorganic porous support materials include titania, zirconia, alumina, vanadia and rare earth oxides which have surface hydroxyl groups. Silicoaluminophosphate of various structures are taught in U.S. Pat. No. 4,440,871.

A breakthrough toward the preparation of mesoporous molecular sieves have been disclosed recently in U.S. Pat. Nos. 5,098,684 and 5,102,643. The claimed class of mesoporous materials (denoted as M41S) of this prior art was found to possess uniform and adjustable pore size in the range of 1.3–10.0 nm. Morphology dependence on preparation condition of M41s materials to form hexagonal (MCM-41), cubic(MCM-48) or layered crystallographic structure (MCM-50) have been disclosed (Beck et al., J. Am. Chem. Soc., 114, 10834–10843; 1992).

Another type of mesoporous material used in the present invention relates to different method of synthesizing porous materials by using amphiphilic block copolymer as templates is shown in U.S. Pat. No. 6,054,111 and WO 99/37705. Polymeric liquid-crystal aggregates are used as templating agents for the synthesis of mesoporous materials, the pore size is adjustable simply by varying the length of the polymer template in the range from 3 to 50 nm.

The mesoporous molecular sieve suitable for use in the present invention can be an acidic crystalline material and preferably has a surface area of at least 100 m²/g. The mesoporous molecular sieve can be a one-dimensional, two-dimensional, or three-dimensional material. A representative example of the one-dimensional molecular sieves is MCM-50. Representative examples of the two-dimensional molecular sieve include MCM-41 and SBA-15. MCM-41 can be hexagonal-arranged, or can have tubules-within-a-tubule morphology. A representative example of the three-dimensional molecular sieve is MCM-48.

The above-mentioned MCM-41 with tubules-within-a-tubule morphology is referred to as TWT-MCM-41 and is synthesized by Mou in U.S. Pat. No. 5,876,690. It is known that MCM-41 is a mesoporous molecular sieve having hexagonal tubules with a diameter of 1.5 to 10.0 nm. The morphology of Mou's mesoporous molecular sieve is different from conventional MCM-41 in its "tubules-within-a-tubule" hierarchical order morphology. The morphology of Mou's molecular sieve provides a better mass tranfer effect. The Mou's TWT-MCM-41 has the following composition:

wherein M is one or more ions of hydrogen, ammonium, alkali metals and alkaline earth metals, n is the charge of the composition excluding the M expressed as oxide, q is the weighed molar average valence of M, a and b are molar fractions of Al and Si, respectively, a+b=1, b>0, and c is a number from 1 to 2.5. Mou's U.S. Pat. No. 5,876,690 is incorporated as a reference and detailed descriptions about Mou's TWT-MCM-41 are omitted here.

Catalysts suitable for use in the present invention are not limited and can be metallocene catalysts, Ziegler-Natta catalysts, free radical polymerization catalysts, cationic polymerization catalysts, anionic polymerization catalysts, ring-opening polymerzation catalysts, condensation polymerization catalysts, or mixtures thereof.

The monomer suitable for use in the process of the present invention is not limited and preferably can contain an olefinic fragment or an alkyne fragment. In addition, the suitable monomer can also contain a functional group that can undergo condensation reaction, such as a carboxyl group (—COOH), a primary, secondary, or tertiary amine group, or a hydroxyl group (—OH).

According to a preferred embodiment of the present invention, when only one monomer and two or more kinds of catalysts are used, the single monomer will undergo different polymerization corresponding to different catalysts, leading to a molecular blended polymer involving different polymers. For example, in the following Examples 7–9, styrene is the only monomer, a metallocene catalyst such as Cp*Ti(OCH₃)₃ (Pentamethylcyclopentadienyltitanium trimethoxide; Cp*=pentamethylcyclopentadienyl) and a free radical polymerization catalyst such as AIBN (2,2'-azobisisobutyronitrile) are used. In an ordinary reactor, styrene is polymerized to syndiotactic polystyrene (sPS) in the presence of a metallocene catalyst, and atactic (amorphous) polystyrene (aPS) in the presence of a free radical polymerization catalyst. Therefore, in the nanoscaled reactor of the present invention, a molecular blended polymer including sPS and aPS is obtained.

According to another preferred embodiment of the present invention, when two or more kinds of monomers and two or more kinds of catalysts are used, the two or more kinds of monomers will undergo different polymerization corresponding to different catalysts within the same nanoreactor, leading to a molecular blended polymer involving different polymers. For example, in the following example 10, two monomers (styrene and ethylene) are used, and a metallocene catalyst such as Cp*Ti(OMe)₃ and a Ziegler-Natta catalyst such as TiCl₄ are used. In an ordinary reactor, styrene is polymerized to syndiotactic polystyrene (sPS) in the presence of a metallocene catalyst, and ethylene is polymerized to polyethylene (PE) in the presence of a Ziegler-Natta catalyst. Therefore, in the nanoscaled reactor of the present invention, a molecular blended polymer including sPS and PE is obtained.

The following examples are intended to illustrate the process and the advantages of the present invention more fully without limiting its scope, since numerous modifications and variations will be apparent to those skilled in the art.

Synthesis of Supports

PRELIMINARY EXAMPLE 1

Mesoporous Material 1.10 g of $EO_{20}PO_{70}EO_{20}$ ((ethylene oxide)$_{20}$(propylene oxide)$_{70}$(ethylene oxide)$_{20}$) (a neutral surfactant) was dissolved in 300 g of water. The solution was stirred at 40° C. for 10 minutes. 80 ml of HCl solution was added and stirred, and 23 g of TEOS was added. The reaction proceeded for 24 hours. The reaction mixture was washed with water, filtered, and calcined at 560° C. for 6 hours to obtain a mesoporous molecular sieve with a pore size of 5 to 7 nm.

Preparation of Catalyst Composition

EXAMPLE 1

A 100 ml reactor was dried in an oven for several hours. 1.0 g of the mesoporous molecular sieve obtained from Preliminary Example 1 and 30 ml of toluene were charged in the reactor in a dry box and stirred thoroughly. A catalyst solution (including 0.06 g of Cp*Ti(OMe)₃ (Cp*=pentamethylcyclopentadienyl) and 0.035 g of AIBN (2,2'-azobisisobutyronitrile) in 10 ml of toluene) was injected into the mesoporous molecular sieve solution with a syringe. In the catalyst solution, the molar ratio of Ti/AIBN was 1:1.

After the catalyst solution was added, the mixture was stirred at room temperature for 48 hours. After the reaction was complete, the reaction mixture was washed with toluene two times, filtered, and concentrated under reduced pressure to collect the solid catalyst.

EXAMPLE 2

A 100 ml reactor was dried in an oven for several hours. 1.0 g of the mesoporous molecular sieve obtained from Preliminary Example 1 and 30 ml of toluene were charged in the reactor in a dry box and stirred thoroughly. A catalyst solution (including 0.06 g of Cp*Ti(OMe) ₃ and 0.07 g of AIBN (2,2'-azobisisobutyronitrile) in 10 ml of toluene) was injected into the mesoporous molecular sieve solution with a syringe. In the catalyst solution, the molar ratio of Ti/AIBN was 1:2.

After the catalyst solution was added, the mixture was stirred at room temperature for 48 hours. After the reaction was complete, the reaction mixture was washed with toluene two times, filtered, and concentrated under reduced pressure to collect the solid catalyst.

EXAMPLE 3

A 100 ml reactor was dried in an oven for several hours. 1.0 g of the mesoporous molecular sieve obtained from Preliminary Example 1 and 30 ml of toluene were charged in the reactor in a dry box and stirred thoroughly. A catalyst solution (including 0.06 g of Cp*Ti(OMe)$_3$ and 0.14 g of AIBN (2,2'-azobisisobutyronitrile) in 10 ml of toluene was injected into the mesoporous molecular sieve solution with a syringe. In the catalyst solution, the molar ratio of Ti/AIBN was 1:4.

After the catalyst solution was added, the mixture was stirred at room temperature for 48 hours. After the reaction was complete, the reaction mixture was washed with toluene two times, filtered, and concentrated under reduced pressure to collect the solid catalyst.

EXAMPLE 4

A 100 ml reactor was dried in an oven for several hours. 1.0 g of the mesoporous molecular sieve obtained from Preliminary Example 1 and 30 ml of toluene were charged in the reactor in a dry box and stirred thoroughly. A Cp*Ti(OMe)$_3$ solution (0.06 g Cp*Ti(OMe)$_3$ in 10 ml of toluene) was injected into the mesoporous molecular sieve solution with a syringe and stirred at room temperature for 24 hours.

A TiCl$_4$ solution (0.06 g of TiCl$_4$ in 10 ml of toluene) was injected into the reactor and stirred for 24 hours. After the reaction was complete, the reaction mixture was washed with toluene two times, filtered, and concentrated under reduced pressure to collect the solid catalyst.

EXAMPLE 5

A 100 ml reactor was dried in an oven for several hours. 1.0 g of the mesoporous molecular sieve obtained from Preliminary Example 1 and 30 ml of toluene were charged in the reactor in a dry box and stirred thoroughly. A Cp$_2$ZrCl$_2$ solution (0.026 g of Cp$_2$ZrCl$_2$ in 10 ml of toluene) was injected into the mesoporous molecular sieve solution with a syringe and stirred at room temperature for 24 hours.

An AIBN solution (0.06 g of AIBN in 10 ml of toluene) was injected into the reactor and stirred for 24 hours. After the reaction was complete, the reaction mixture was washed with toluene two times, filtered, and concentrated under reduced pressure to collect the solid catalyst.

EXAMPLE 6

A 100 ml reactor was dried in an oven for several hours. 1.0 g of the mesoporous molecular sieve obtained from Preliminary Example 1 and 30 ml of toluene were charged in the reactor in a dry box and stirred thoroughly. An AIBN solution (0.12 g of AIBN in 10 ml of toluene) was injected into the mesoporous molecular sieve solution with a syringe and stirred at room temperature for 24 hours.

A TiCl$_4$ solution (0.06 g of TiCl$_4$ in 10 ml of toluene) was injected into the reactor and stirred for 24 hours. After the reaction was complete, the reaction mixture was washed with toluene two times, filtered, and concentrated under reduced pressure to collect the solid catalyst.

Synthesis of Pure Polymer

COMPARATIVE EXAMPLE 1

Pure sPS Using Cp*Ti(OCH$_3$)$_3$

The reactor vessel was heated to 80° C., evacuated for 1 hour, and introduced with nitrogen gas three times. 50 ml of toluene (water amount <10 ppm) was transferred into the reactor. 50 ml of styrene (water amount<10 ppm) was transferred into the reactor. 1 ml of 22.6 wt % TIBA (triisobutylaluminum) was charged into the reactor under nitrogen and stirred for 2 minutes. 1 ml of MAO (1.49 M methyl aluminoxane) was charged and stirred for 2 minutes. After the temperature was stabilized at 80° C. for at least two minutes, 2×10$^{-5}$ mole of Cp*Ti(OCH$_3$)$_3$ was charged and stirred at 600 rpm.

After the reaction was complete (atoub 60 minutes), the reaction mixture was poured out and methanol was added to precipitate the product. The product was filtered and dried in a 50° C. oven. FIG. 1 is an optical micrograph, taken at a optical polarizing microscopy, of the obtained pure sPS (syndiotactic polystyrene).

COMPARATIVE EXAMPLE 2

Pure aPS Polymerization Using AIBN

The reactor vessel was heated to 80° C., evacuated for 1 hour, and introduced with nitrogen gas three times. 50 ml of toluene (water amount<10 ppm) was transferred into the reactor. 50 ml of styrene (water amount<10 ppm) was transferred into the reactor. After the temperature was stabilized at 80° C. for at least two minutes, 50 mg of the catalyst composition of Example 1 was charged and stirred at 600 rpm.

Figure 2:
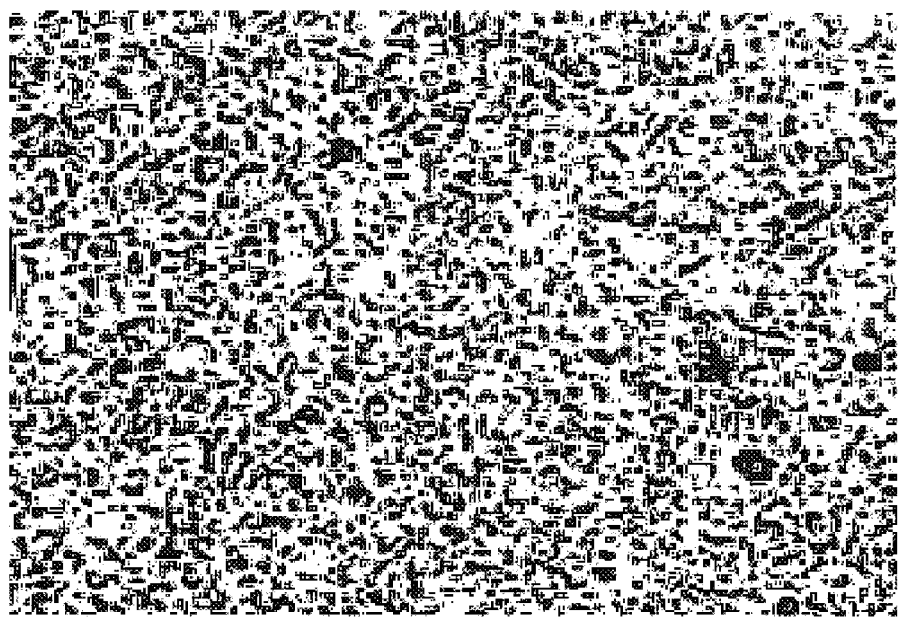
FIG. 2 is an optical micrograph, taken at an optical polarizing microscopy, of pure atactic polystyrene (aPS).

After the reaction was complete (about 60 minutes), the reaction mixture was poured out and methanol was added to precipitate the product. The product was filtered and dried in a 50° C. oven. FIG. 2 is an optical micrograph, taken at a optical polarizing microscopy, of the obtained pure aPS (atatic polystyrene).

Synthesis of Polymer Blend

COMPARATIVE EXAMPLE 3

Synthesis of sPS/aPS Blend by a Conventional Homogeneous Catalyst

The reactor vessel was heated to 90° C., evacuated for 1 hour, and introduced with nitrogen gas three times. 100 ml of toluene (water amount<10 ppm) was transferred into the reactor. 50 ml of styrene (water amount<10 ppm) was transferred into the reactor. 1 ml of TIBA (triisobutylaluminum) was charged into the reactor under nitrogen and stirred for 2 minutes and then 1 ml of MAO (1.49 M methyl aluminoxane) was charged. After the temperature was stabilized at 80° C., 2.17×10$^{-5}$ mole of Cp*Ti(OMe)$_3$, and 4.27×10$^{-5}$ mole of AIBN were charged and stirred at 350 rpm. Since two kinds of catalysts, Cp*Ti(OMe)$_3$ and AIBN, were used, it was predicted that two polymers (sPS and aPS) were obtained.

Figure 3:
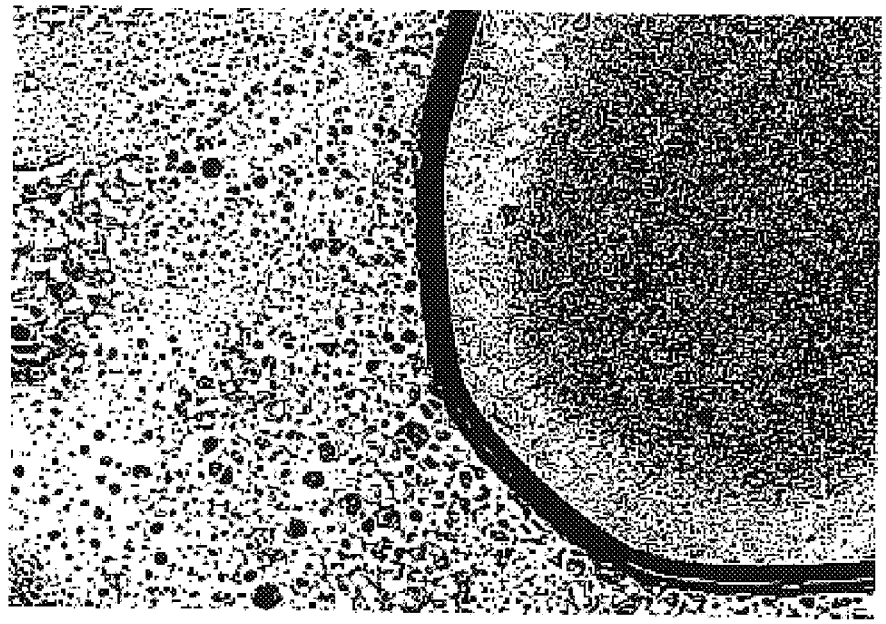
FIG. 3 is an optical micrograph, taken at an optical polarizing microscopy, of sPS/aPS blend prepared by a conventional homogeneous catalyst in Comparative Example 3.

After the reaction was complete (about 2 hours), the reaction mixture was poured out and methanol was added to precipitate the product. The product was filtered and dried in a 50° C. oven for various tests. The results obtained are shown in Table 1. FIG. 3 is an optical micrograph, taken at a optical polarizing microscopy, of the obtained sPS/aPS blend. It can be seen from the photograph that there exist two phases (the left half is aPS and the right half is sPS) and an obvious boundary is present between the two phases.

EXAMPLE 7

Synthesis of Molecular Blended sPS/aPS by a Mesoporous Molecular Sieve Supported Catalyst The reactor vessel was heated to 90° C., evacuated for 1 hour, and introduced with nitrogen gas three times. 100 ml of toluene (water amount<10 ppm) was transferred into the reactor. 50 ml of styrene (water amount<10 ppm) was tranferred into the reactor. 1 ml of TIBA (triisobutylaluminum) was charged into the reactor under nitrogen and stirred for 2 minutes and then 1 ml of MAO (1.49 M methyl aluminoxane) was charged. After the temperature was stabilized at 80° C., 0.1 g of the catalyst composition (in 10 ml of toluene) prepared from Example 1 was charged and stirred at 350 rpm. Since two kinds of catalysts, Cp*Ti(OMe)$_3$ and AIBN, were used, it was predicted that two polymers (sPS and aPS) were obtained.

Figure 4:
FIG. 4 is an optical micrograph, taken at an optical polarizing microscopy, of molecular blended sPS/aPS prepared by a mesoporous molecular sieve supported catalyst in Example 7 of the present invention.

After the reaction was complete (about 2 hours), the reaction mixture was poured out and methanol was added to precipitate the product. The product was filtered and dried in a 50° C. oven for various tests. The results obtained are shown in Table 1. FIG. 4 is an optical micrograph, taken at a optical polarizing microscopy, of the obtained molecular blended sPS/aPS. It can be seen from the photograph that there exists only one phase and no domain boundary observed in FIG. 3 exists. This indicates that sPS and aPS are blended well.

EXAMPLES 8 AND 9

The same procedures were performed as described in Example 7, except that the Ti/AIBN molar ratio of the catalyst composition used was changed to 1:2 and 1:4 respectively. The results are shown in Table 1.

TABLE 1

| Example | Catalyst type | Ti/AIBN mole | Tm ° C. | ΔH J/g |
|---|---|---|---|---|
| Comp. Example 3 | Homogeneous | 1:2 | 278.1 | 15.9 |
| Example 7 | Heterogeneous | 1:1 | 271.1 | 18.6 |
| Example 8 | Heterogeneous | 1:2 | 273.4 | 12.9 |
| Example 9 | Heterogeneous | 1:4 | 273.1 | 11 |

It can be seen from Table 1 that by increasing the AIBN amount, the aPS amount obtained increases, thus decreasing ΔH (fusion heat enthalpy) of sPS.

EXAMPLE 10
Polymerization Using Two Catalysts and Two Monomers

The reactor vessel was heated to 90° C., evacuated for 1 hour, and introduced with nitrogen gas three times. 100 ml of toluene (water amount<10 ppm) was transferred into the reactor. 50 ml of styrene (water amount<10 ppm) was tranferred into the reactor. 1 ml of TIBA (triisobutylaluminum) was charged into the reactor under nitrogen and stirred for 2 minutes and then 0.5 ml of MAO (1.49 M methyl aluminoxane) was charged. After the temperature was stabilized at 80° C., 0.1 g of the catalyst composition (in 10 ml of toluene) prepared from Example 4 was charged, ethylene was introduced, and the mixture was stirred at 600 rpm.

After the reaction was complete (about 1 hour), the reaction mixture was poured out and methanol was added to precipitate the product. The product was filtered and dried in a 50° C. oven. Tm is 130° C. and 267° C. determined by DSC, which are the Tm of PE and sPS respectively.

EXAMPLE 11
Polymerization Using Two Catalysts and Two Monomers

The reactor vessel was heated to 90° C., evacuated for 1 hour, and introduced with nitrogen gas three times. 100 ml of toluene (water amount<10 ppm) was transferred into the reactor. 50 ml of styrene (water amount<10 ppm) was tranferred into the reactor. 1 ml of TIBA was charged into the reactor under nitrogen and stirred for 2 minutes and then 0.5 ml of MAO (1.49 M methyl aluminoxane) was charged. After the temperature was stabilized at 80° C., 0.1 g of the catalyst composition (in 10 ml of toluene) prepared from Example 5 was charged, ethylene was introduced, and the mixture was stirred at 600 rpm.

After the reaction was complete (about 1 hour), the reaction mixture was poured out and methanol was added to precipitate the product. The product was filtered and dried in a 50° C. oven. Tm is 133° C. (PE) and Tg is 100° C. (atactic PS), both determined by DSC.

EXAMPLE 12
Polymerization Using Two Catalysts and Two Monomers

The reactor vessel was heated to 80° C., evacuated for 1 hour, and introduced with nitrogen gas three times. 250 ml of toluene (water amount<10 ppm) was transferred into the reactor. 50 ml of styrene (water amount<10 ppm) was tranferred into the reactor. 1 ml of TIBA was charged into the reactor under nitrogen and stirred for 2 minutes and then 0.5 ml of MAO (1.49 M methyl aluminoxane) was charged. After the temperature was stabilized at 80° C., 0.1 g of the catalyst composition (in 10 ml of toluene) prepared from Example 6 was charged, ethylene was introduced, and the mixture was stirred at 600 rpm.

After the reaction was complete (about 30 minutes), the reaction mixture was poured out and methanol was added to precipitate the product. The product was filtered and dried in a 50° C. oven. Tm is 130° C. (PE) and Tg is 98° C. (atactic PS) both determined by DSC.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for preparing a molecular blended polymer, wherein the molecular blended polymer includes two or more types of polymers blended at the molecular level, wherein the process includes:

providing a mesoporous molecular sieve having a pore size of 20 Å to 500 Å; and contacting the mesoporous molecular sieve, at least one monomer, and a catalytically effective amount of two or more kinds of catalysts under polymerizing conditions to undergo polymerization.

2. The process as claimed in claim 1, wherein the process includes:

providing a mesoporous molecular sieve having a pore size of 20 Å to 500 Å; and preparing a supported catalyst by reacting the mesoporous molecular sieve and two or more kinds of catalysts; and polymerizing at least one monomer under polymerizing conditions in the presence of a catalytically effective amount of the supported catalyst.

3. The process as claimed in claim 2, wherein the mesoporous molecular sieve is an acidic crystalline material.

4. The process as claimed in claim 3, wherein the mesoporous molecular sieve has a surface area of at least 100 m$^2$/g.

5. The process as claimed in claim 4, wherein the mesoporous molecular sieve is MCM-50.

6. The process as claimed in claim 4, wherein the mesoporous molecular sieve is MCM-41.

7. The process as claimed in claim 6, wherein the mesoporous molecular sieve is a hexagonal-arranged MCM-41.

8. The process as claimed in claim 6, wherein the mesoporous molecular sieve is a MCM-41 having tubules-within-a-tubule morphology.

9. The process as claimed in claim 4, wherein the mesoporous molecular sieve is SBA-15.

10. The process as claimed in claim 4, wherein the mesoporous molecular sieve is a three-dimensional material.

11. The process as claimed in claim 10, wherein the mesoporous molecular sieve is MCM-48.

12. The process as claimed in claim 1, wherein the catalyst is selected from the group consisting of metallocene catalysts, Ziegler-Natta catalysts, free radical polymerization catalysts, cationic polymerization catalysts, anionic polymerization catalysts, ring-opening polymerization catalysts, condensation polymerization catalysts and mixtures thereof.

13. The process as claimed in claim 1, wherein the monomer contains an olefinic fragment or an alkyne fragment.

14. The process as claimed in claim 1, wherein the monomer contains a functional group that can undergo a condensation reaction.

15. The process as claimed in claim 14, wherein the monomer contains a carboxyl group (—COOH), a primary, secondary, or tertiary amine group, or a hydroxyl group (—OH) that can undergo a condensation reaction.

16. The process as claimed in claim 12, wherein the monomer is styrene, the catalysts include a metallocene catalyst and a free radical polymerization catalyst, and the molecular blended polymer includes syndiotactic polystyrene and atactic polystyrene blended in the pore of the mesoporous molecular sieve.

17. The process as claimed in claim 12, wherein the monomer includes styrene and ethylene, the catalysts include a metallocene catalyst and a Ziegler-Natta catalyst, and the molecular blended polymer includes syndiotactic polystyrene and polyethylene blended in the pore of the mesoporous molecular sieve.

18. The process as claimed in claim 12, wherein the monomer includes styrene and ethylene, the catalysts include a metallocene catalyst and a free radical polymerization catalyst, and the molecular blended polymer includes atactic polystyrene and polyethylene blended in the pore of the mesoporous molecular sieve.

19. The process as claimed in claim 12, wherein the monomer includes styrene and ethylene, the catalysts include a free radical polymerization catalyst and a Ziegler-Natta catalyst, and the molecular blended polymer includes atactic polystyrene and polyethylene blended in the pore of the mesoporous molecular sieve.

20. A process for preparing a molecular blended polymer, wherein the molecular blended polymer includes two or more types of polymers blended at the molecular level, wherein the process includes:

providing a mesoporous molecular sieve having a pore size of 20 Å to 500 Å; and preparing a supported catalyst by reacting the mesoporous molecular sieve and two or more kinds of catalysts; and polymerizing at least one monomer under polymerizing conditions in the presence of a catalytically effective amount of the supported catalyst, wherein the mesoporous molecular sieve is an acidic crystalline material having a surface area of at least 100 $m^2/g$, which is MCM-50, MCM-41, SBA-15, or MCM-48.

* * * * *